Nov. 11, 1969  R. A. WAGSTAFF  3,477,308
LEVER MOUNTING
Filed Jan. 4, 1968
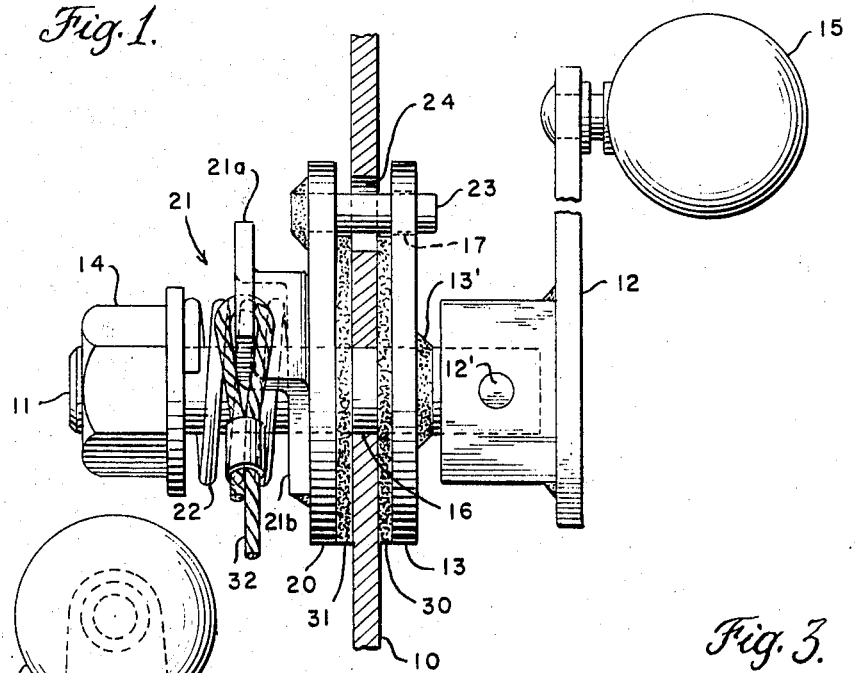
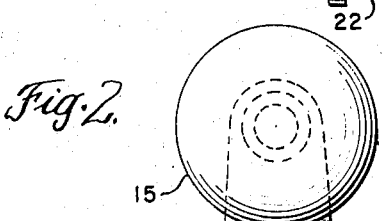
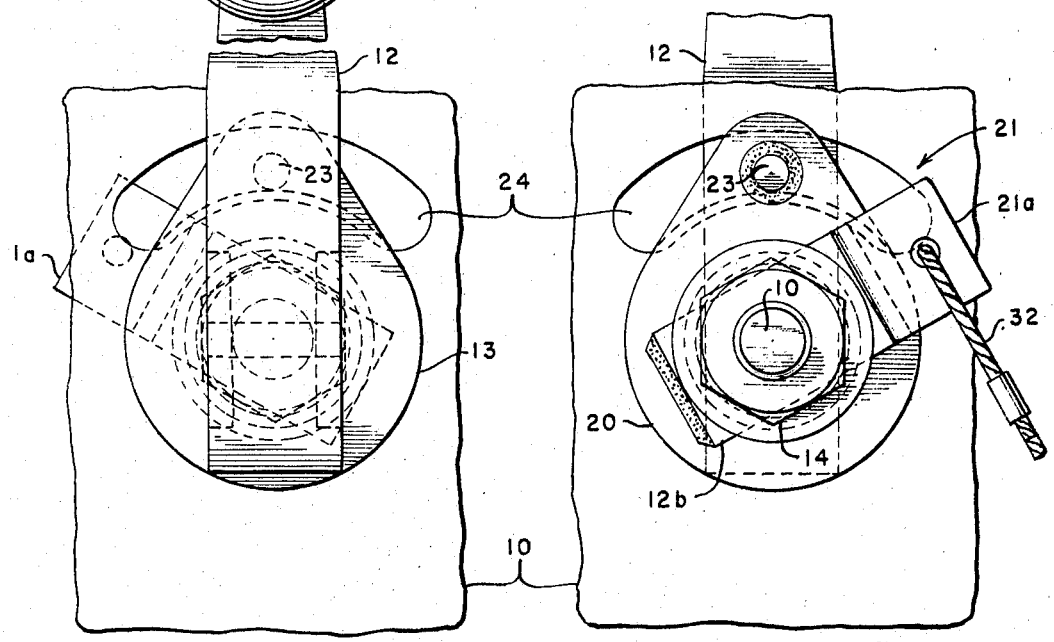
INVENTOR.
R. A. WAGSTAFF
BY
*Joseph A. Brown*
ATTORNEY 3,477,308
LEVER MOUNTING
Robert A. Wagstaff, New Holland, Pa., assignor to Sperry Rand corporation, New Holland, Pa., a corporation of Delaware
Filed Jan. 4, 1968, Ser. No. 695,615
Int. Cl. G05g 1/08
U.S. Cl. 74—504      4 Claims

ABSTRACT OF THE DISCLOSURE

A lever mounting wherein a pair of axially spaced plates, separated by friction pads and a mounting wall, are connected by means of a pin extending transversely between the plates through an aperture in the wall so that as a first lever located on one side of the wall is turned the load is transferred from the first plate to the second plate by the pin, causing a second lever, fixed to the second plate, to operate, while the friction pads serve to retain the device in a desired setting.

BACKGROUND OF THE INVENTION

This invention relates to a lever mounting in which a first lever, such as a manually operable control lever for some mechanism on a farm machine, would be disposed outside the housing of the machine, while a second lever is mounted within the machine housing and is connected to an element to be controlled.

In a machine where such a device might be used, it is desirable to provide easy access to allow for maintenance. A fixed wall between the inner and outer levers has presented several problems in providing a device which is easily accessible and economical to manufacture. Previously, this type of connection was achieved by separating the shafts into two parts and machining mating splines on the ends of the shafts. Such apparatus was both costly to manufacture and to assemble.

These critical features will be overcome by the invention because the present device is capable of being assembled and disassembled axially so that it may be installed or replaced from opposite sides of a fixed mounting surface. Further, the mechanically advantageous method of transmitting rotational forces enables the parts to be manufactured and fitted at less critical tolerances than would otherwise be required.

SUMMARY OF THE INVENTION

Accordingly, the present invention presents a means of rotational forces to be transmitted from an exterior lever to an interior lever in a mechanically advantageous manner, while at the same time presenting a device which is economical to manufacture and easy to assemble.

DESCRIPTION OF THE DRAWINGS

FIG. 1 is a side elevation of a lever mounting arrangement constructed according to this invention and connected to a housing wall shown in vertical section;

FIG. 2 is an end view of the lever mounting looking from the right in FIG. 1; and FIG. 3 is an end view of the lever mounting looking from the left in FIG. 1.

Referring now to the drawings, the lever mounting shown in FIG. 1 is comprised of a fixed mounting wall 10 having a circular aperture 16 therein, a shaft 11 extending horizontally through the aperture 16 in wall 10, a lever 12 secured to one end of shaft 11, retaining means, such as nut 14, and pressure plates 13 and 28 mounted on the shaft on either side of the wall.

The lever 12 is secured to shaft 11 using any suitable means, such as pin 12'. The end of lever 12 is provided with a ball handle 15, as shown in FIGS. 1 and 2.

The first pressure plate 13, tear drop in shape, is securely fixed by welding 13' or the like to shaft 11 in a spaced relation with respect to wall 10 and parallel thereto as shown in FIG. 1. An aperture 17 is provided in the upper portion of plate 13 adjacent the periphery thereof.

The second tear drop shaped pressure plate 20 is freely rotatably mounted on shaft 11 so as to be relatively movable with respect thereto. A second lever 21 is comprised of an angled element having two leg portions 21a and 21b. Leg portion 21b is welded or otherwise suitable fixed to plate 20, as shown in FIGS. 1 and 3.

Pin 23 forms a connecting means between the first and second plates 13 and 20. The pin is fixed to the upper portion of the plate 20, adjacent the outer periphery thereof, extending transversely outward from the surface of the plate. Pin 23 extends through an arcuate slot 24, formed in wall 10, slot 24 is parallel to and spaced radially from circular aperture 16, into aperture 17 formed in plate 13. Thus, as will be seen hereinafter, a connection is established between lever 12 and lever 21.

The location of the force transmitting pin 23 radially outwardly from the axis of shaft 11 places it in a mechanically advantageous position for transmitting rotational forces from the first lever 12 to the second lever 21 about the axis of the shaft. This feature enables the parts to be manufactured and fitted at less critical tolerances than would be required if the forces were transmitted by a part located near the axis of the shaft.

A biasing means 22 is formed around shaft 11 with one end abutting against the retaining means 14 and the other against pressure plate 20. A force, exerted by spring 22, causes plate 20 to be urged toward wall 10. By manipulation of retaining means 14 the tension of spring 22 against pressure plate 20 may be varied.

By disposing friction pads 30 and 31 between the plates and the wall, as shown in FIG. 1, a friction locking arrangement is achieved. The friction lock relation between plate 13 and the wall is established due to the fixed relation of the plate to the wall, while the frictional engagement of plate 20 and the wall is caused as a result of biasing means 22 urging the plate against friction pad 31 and the wall.

In operation, as handle 15 and lever 12 are rotated in either direction, a simultaneous rotation is imparted to shaft 11. Since plate 13 is fixed to the shaft 11, they rotate as a unit in the same direction and through the same distance. The rotation of plate 13 causes a corresponding rotation in plate 20 resulting from the pin connection 23 therebetween. Pin 23 rides in slot 24 which provides a limit of travel for the pin as the first lever is moved in either direction. Forces are then transmitted from the first pressure plate 13 to the second pressure plate 20 through pin 23. The transmitted rotational force causes a corresponding rotation of the second lever 21 which is fixed to plate 20 so as to actuate a cable 32, fixed to the lever, making a desired regulation of the element to be controlled. When the regulation is complete, the device maintains a set position as a result of the action of friction pads 30 and 31 against wall 10.

While this invention has been described in connection with a particular embodiment thereof, it will be understood that it is capable of modification, and that this application is intended to cover any variations, uses, or adaptations following, in general, the principles of the invention and including such departures from the present disclosure as come within the known or customary practice in the art to which the invention pertains, and as fall within the scope of the invention or the limits of the appended claims.

Having thus described my invention, what I claim is:

1. A lever mounting comprising a mounting wall having a pair of apertures therein, a shaft extending through one of said apertures, retaining means on one end of said shaft, first lever means secured to the other end of said shaft, first and second plate means on said shaft on opposite sides of said wall, second lever means fixed to said second plate means, means connecting said plate means and disposed radially outwardly of said shaft to transfer loads from said first lever to said second lever, friction pad disposed between said plates and said wall, and biasing means on said shaft between said second plate and said retaining means.

2. A lever mounting as set forth in claim 1, wherein said apertures are radially spaced and comprise a circular opening and an arcuate slot, said shaft extending through said circular opening and said means connecting said plates extending through said arcuate slot, said slot defining the limit of travel of said plate connecting means.

3. A lever mounting as set forth in claim 1, wherein said first plate means is fixed to said shaft, while said second plate means is relatively movable with respect to said shaft, said second plate being constantly urged toward said wall by said biasing means.

4. A lever mounting as set forth in claim 2, wherein said means connecting said plates is comprised of a pin fixed to said second plate radially outwardly from the axis of said shaft and extending transversely from the surface of said second plate through said arcuate slot into an aperture provided in said first plate.

References Cited
UNITED STATES PATENTS

| | | | |
|---|---|---|---|
| 2,560,015 | 7/1951 | Waldron | 74—504 XR |
| 2,919,601 | 1/1960 | Cain | 74—511 XR |
| 3,315,959 | 4/1967 | Carnielli | 74—531 XR |
| 3,400,605 | 9/1968 | Hood | 74—531 XR |

FRED C. MATTERN, Jr., Primary Examiner

F. D. SHOEMAKER, Assistant Examiner